United States Patent
Englund et al.

(10) Patent No.: US 8,018,855 B2
(45) Date of Patent: Sep. 13, 2011

(54) RADIO BEARER SPECIFIC CQI REPORTING

(75) Inventors: Eva Englund, Linköping (SE); Pål Frenger, Linköping (SE); Kristina Jersenius, Linköping (SE); Michael Meyer, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 12/531,727

(22) PCT Filed: Sep. 27, 2007

(86) PCT No.: PCT/SE2007/050684
§ 371 (c)(1),
(2), (4) Date: Oct. 9, 2009

(87) PCT Pub. No.: WO2008/115111
PCT Pub. Date: Sep. 25, 2008

(65) Prior Publication Data
US 2010/0103833 A1 Apr. 29, 2010

(30) Foreign Application Priority Data
Mar. 19, 2007 (SE) ...................................... 0700701

(51) Int. Cl.
*H04L 12/26* (2006.01)
(52) U.S. Cl. ...................................................... 370/241
(58) Field of Classification Search ........................ None
See application file for complete search history.

(56) References Cited

U.S. PATENT DOCUMENTS
2008/0056227 A1* 3/2008 Love et al. ................... 370/343

FOREIGN PATENT DOCUMENTS
EP 1641302 A1 3/2006
EP 1750407 A1 2/2007

OTHER PUBLICATIONS

3rd Generation Partnership Project. "CQI Feedback for EUTRA." 3GPP TSG RAN1 #47bis, R1-070049, Sorrento, Italy, Jan. 15-19, 2007.
3rd Generation Partnership Project. "Control of CQI Feedback Singnalling in E-UTRA." 3GPP TST RAN WG1 Meeting #48, Tdoc R1-071093, St. Louis, US, Feb. 12-16, 2007.
3rd Generation Partnership Project. "Two-layer CQI Scheme for Improved PUCCH Efficiency." 3GPP TSG-RAN WG1 Meeting #49bis, R1-073009, Orlando, US, Jun. 25-29, 2007.
3rd Generation Partnership Project. "On CQI Reporting." 3GPP TSG-RAN WG1 Meeting # 50, R1-073746, Athens, Greece, Aug. 20-24, 2007.

* cited by examiner

*Primary Examiner* — Kevin C Harper
(74) *Attorney, Agent, or Firm* — Coats & Bennett, P.L.L.C.

(57) ABSTRACT

An improved mechanism for providing channel state feedback from a user equipment (UE) 800, to a base station 900 is provided, applying radio bearer specific channel state feedback reporting trigger criteria at the UE. In the UE it is initially determined (502) whether at least one channel state feedback reporting trigger criteria is valid or not, comprising the step of determining whether one or more channel state feedback reporting trigger is applied to one or more specific radio bearers. If this is the case, a channel state feedback report of a specified type is generated (510) and transmitted (511) to the base station. Such a mechanism provides for a more efficient control signaling of channel state feedback information between a base station and a UE.

12 Claims, 6 Drawing Sheets

| | |
|---|---|
| CRT 1 | CQI A |
| CRT 2 | CQI B |
| CRT 3 | CQI C |
| . | . |
| . | . |
| . | |
| CRT n | CQI X |

|       | RB 1 | RB 2 | RB 3 | RB 4 |
|-------|------|------|------|------|
| CRT 1 | x    |      |      | x    |
| CRT 2 |      | x    |      |      |
| CRT 3 |      | x    |      |      |
| CRT 4 |      |      |      | x    |

RADIO BEARER SPECIFIC CQI REPORTING

TECHNICAL FIELD

The present invention relates generally to channel state feedback provided from a user equipment to a base station, and more specifically to providing channel state feedback adapted to different types of downlink traffic.

BACKGROUND

Recent increase of mobile data usage and emergence of new applications such as gaming, mobile TV and streaming content have motivated the $3^{rd}$ Generation Partnership Project (3GPP) to work on the Long-Term Evolution (LTE) in order to ensure 3GPP's competitive edge over other, competitive cellular technologies.

LTE has been set aggressive performance requirements which rely on physical layer technologies, such as e.g. Orthogonal Frequency Division Multiplexing (OFDM) and Multiple-Input Multiple-Output (MIMO) systems to achieve these targets. Some main objectives of LTE are to minimize the system and User Equipment (UE) complexities, to allow flexible spectrum deployment in existing or new frequency spectrum and to enable co-existence with other 3GPP Radio Access Technologies (RATS).

The LTE uplink is based on single-carrier modulation and uses frequency and time division multiple access principles (FDMA and TDMA), The LTE uplink consists of physical uplink control channels and data channels that are orthogonally frequency multiplexed. The single-carrier property of the LTE uplink makes it impossible for a UE to transmit on a physical control channel and a physical data channel in the same transmission-time-interval (TTI). Hence, if a UE is transmitting data on a physical data channel, the control information that has to be sent in the same TTI must also be sent on the physical data channel. The UE will use the physical control channel to transmit control signaling only in the case when the UE has no data transmission, and hence is not using the physical data channel.

In the LTE concept defined in the ongoing 3GPP work on standardization, the downlink will support fast channel dependent scheduling in both the time and frequency domains. A conventional downlink scheduling concept according to the prior art, can be described with stages 1:1-1:4, as illustrated in FIG. 1. A base station 100, which is referred to as an eNodeB in LTE, communicating with a UE 101, transmits reference signals to UE 101 in a first stage 1:1. The reference signals can be used by UE 101 to determine the present downlink channel quality. LTE uses feedback from the UE to the eNodeB of the instantaneous channel conditions. After having determined the downlink channel quality on the basis of the received reference signals, UE 101 therefore sends one or more channel state feedback reports, which in this context typically are referred to as Channel Quality Indication (CQI) reports, back to eNodeB 100 in a second stage 1:2. In eNodeB 100, the content of the one or more CQI reports can be retrieved and used by a scheduler (not shown). The scheduler uses the information retrieved from the CQI reports to perform resource allocation. UE 101 is informed of the resource allocation in a next stage 1:3. A resource allocation typically results in a transmission of downlink data over the allocated resource, as indicated with a final stage 1:4.

More on this issue can be found in "3G Evolution: HSPD and LTE for Mobile Broadband" E. Dahlman, S. Parkvall, J. Sköld, P, Beming, Academic Press, 2007.

According to one proposal for LTE, UEs will be capable of transmitting different types of CQI reports, such as full CQI reports, partial CQI reports, and/or differential CQI reports. In this context, full CQI reports are defined to cover the whole downlink transmission bandwidth scheduled for a UE, but may have different frequency resolution. This type of CQI reports may be filtered and processed in different ways. In addition, different full CQI reports may be encoded in different ways. Partial CQI reports on the other hand may be set to cover only a part of a specified downlink transmission bandwidth. The part covered by a partial CQI report may be a set of contiguous, or a set of distributed resource blocks. Finally, a differential CQI report may contain an encoded version of the update vector relative to a previous CQI report.

A CQI reporting mechanism which is based on different types of CQI reports, such as e.g. the ones described above, may be introduced by way of, for each CQI report type, defining a set of rules that triggers the transmission of a report of the respective CQI report type from a respective UE. Each UE has a configured CQI reporting trigger set (CRTS), wherein the CRTS consists of one or more CQI reporting triggers (CRT), specifying under which criteria a specific type of CQI report shall be transmitted. Each CRT is associated with a specific type of CQI report in such a way that when a triggering criteria is fulfilled, the respective UE transmits a CQI report of the associated type to the respective eNodeB.

A CRT is typically expressed in terms of a logical expression which may involve one of, or a combination of timers, events, and conditions, consisting of logical statements, such as AND, OR, NOT, WHEN, and/or IF. A simple periodic CQI reporting trigger may just consist of a periodic timer and a rule that a certain CQI report shall be transmitted every time the timer expires. A simple event based CQI reporting trigger may state that a certain type of CQI report shall be transmitted every time the triggering event, such as e.g. a handover event, occurs. A condition that could be included in the decision to transmit a certain CQI report or not, is e.g. if the downlink activity is above a specified threshold. In addition to configuring rules, defining when and how CQI reports are to be transmitted, the eNodeB may also have the option to explicitly request for CQI reports on demand, typically by using RRC signaling.

FIG. 2 illustrates a table of a CQI trigger configuration of a UE, as described above. The table comprises a plurality of CQI reporting triggers, CRT 1-$n$, configured for the UE. Each CRT is associated with one CQI report type, CQI A-X. When for example the trigger criteria specified by CRT 1 is true, a report type, defined by CQI A will be transmitted from the UE to an eNodeB, as indicated in the table. What types of CQI reports a UE shall use, and what criteria that will trigger them, are typically set-up by higher layer, RRC signaling.

CQI reports may occur at known time instances and may use a format known to the eNodeB, or the occurrence and format may be more dynamic. In the latter case the MAC header typically needs to include information about how the CQI report was transmitted, or else the eNodeB may have to perform blind detection on the CQI transmission format.

Furthermore, for CQI reports used together with different antenna configurations, such as SISO (Single-Input Single-Output), MISO (Multiple-Input Single-Output), SIMO (Single-Input Multiple-Output), or MIMO (Multiple-Input Multiple-Output), transmission could also be different. In case of a MIMO configuration, a CQI report may include information, such as e.g. pre-coding weights or other feedback parameters, to be used by the eNodeB multiple antenna transmission scheme. The amount of resources needed to be reserved for a certain UE will also depend on the MIMO scheme configured for that UE, potentially adding further complication to the configuration of the reserved resources.

From an overhead perspective, it is desirable to keep the number of bits in the CQI reports to a minimum. At the same time, the larger the number of bits in the CQI report, the higher amount of information can be provided to the scheduler of the eNodeB, allowing for the possibility of higher downlink throughput. Therefore, a trade-off between the two is required. The amount of bits that can be spent on CQI reporting may depend on a number of different criteria, such as: downlink transmission mode, e.g. SISO or MIMO; type of downlink traffic, e.g. VoIP or Web; downlink radio characteristics, e.g. coherence time and/or coherence bandwidth; current uplink load and/or current downlink activity.

CQI reports can be transmitted in two ways. A CQI report can be transmitted on a dedicated control channel resource when no data is transmitted simultaneously, or on a scheduled resource on a shared channel when uplink data and control signaling is transmitted simultaneously. A drawback with such a scheme is that resources must be reserved for control signaling; resources that will be unused when the UE is transmitting data simultaneously with control signaling. This further adds to the importance of keeping the CQI reporting overhead at a minimum.

Every UE normally have access to a number of radio bearers. To each radio bearer there is a QoS label specified, characterizing QoS requirements and traffic characteristics of the respective radio bearer. Some of these radio bearers are classified as Guaranteed Bit Rate (GBR) bearers, typically to be used for e.g. voice telephony or streaming video, while other radio bearers are classified as Non Guaranteed Bit Rate bearers.

In order to fully support all possible CQI reporting schemes in all possible scenarios one would have to allocate an unreasonable amount of physical resources for the physical control signaling.

Even with a limited number of schemes applied, new feedback schemes are difficult to introduce, especially if they require that the uplink physical control channels need to be re-designed.

SUMMARY

The present invention aims to solve at least one problem addressed above by providing a more efficient use of the signalling resources when delivering channel state feedback information from a User Equipment (UE) to an base station.

The present invention according to one embodiment relates to a method for providing channel state feedback from a UE to a base station. The method comprises the step of determining whether at least one channel state feedback reporting trigger criteria is valid or not, wherein each one or more channel state feedback reporting trigger is applied to one or more specific radio bearers. A channel state feedback report of a specified type is generated if at least one channel state feedback reporting trigger criteria is found to be valid, and the generated channel state feedback report is transmitted to the base station. According to this embodiment, the UE, thus, decides if a channel state feedback report is to be transmitted by checking for every trigger criteria that has been met that the respective trigger also is applied to at least one radio bearer.

According to another embodiment, two or more different types of channel state feedback reports are applied for the UE. In this case a separate set of radio bearer specific channel state feedback reporting trigger criteria is applied for each channel state feedback report type. The determining step may be repeated for each set of channel state feedback reporting trigger criteria, and every match is registered. On the basis of the registered one or more matches, one or more channel state feedback reports are generated and transmitted when all channel state feedback reporting trigger criteria specified for the UE has been checked.

According to yet another embodiment, one or more channel state feedback reports are generated and transmitted on the basis of a prioritization rule, specifying how to prioritize between different channel state feedback report types and/or subsets of channel state feedback report types. The generated reports are then transmitted to the UE.

According to another aspect, a base station, comprising a scheduler for providing configured channel state feedback reporting trigger criteria to a UE is provided. In a first step radio bearer specific channel state feedback reporting trigger criteria is generated for the UE. When generating such channel state feedback trigger criteria, each channel state feedback reporting trigger is applied to one or more specific radio bearers. The generating step is repeated for each channel state feedback report type to be applied to the UE, thereby providing a radio bearer specific channel state feedback configuration to the UE. Finally, the channel state feedback reporting trigger criteria configuration is transmitted to the UE.

According to an alternative embodiment, the generating step comprises rules, specifying how to prioritize between different types of channel state feedback reports and/or different subsets of channel state feedback report types when channel state feedback reporting trigger criteria for more than one type has been found to valid for the UE. The radio bearer specific channel state feedback reporting trigger criteria may be transmitted to the UE through higher layer signaling. In addition, when specifying the radio bearer specific channel state feedback reporting trigger criteria, such a procedure may be based on the relation between downlink and uplink data of said UE.

According to yet another aspect, a user equipment to be operating in a communication network is adapted to provide radio bearer specific channel state feedback to a base station. The UE comprises a determining unit for determining whether at least one channel state feedback reporting trigger criteria, wherein each channel state feedback reporting trigger is applied to one or more radio bearers, configured for the UE is valid or not. The UE also comprises a generating unit, for generating a channel state feedback report of a specific type if at least one channel state feedback reporting trigger criteria is found to be valid. A transmitting unit of the UE is then used for transmitting a generated channel state feedback report to the base station.

According to another embodiment, two or more different types of channel state feedback reports are applied for the UE. In such a case, a separate set of channel state feedback reporting trigger criteria is applied for the UE for each channel state feedback report type. The determining unit, may be adapted to execute the described determination for each set of radio bearer specific channel state feedback reporting trigger criteria, and the generating unit may be adapted to generate at least one channel state feedback report once all channel state feedback reporting trigger criteria specified for the UE has been checked. The generating unit may also comprise a storing unit for storing an indication of each report type for which an associated channel state feedback reporting trigger criteria has been found to be valid in said determining step.

In an alternative embodiment, the generating unit may be adapted to base its selection of report type on a prioritization between different channel state feedback report types and/or subsets of channel state feedback report types.

According to another aspect, a base station for providing configured channel state feedback reporting trigger criteria to a UE is suggested. The base station, which typically is an eNodeB, comprises a generating unit for generating channel state feedback reporting trigger criteria for the UE, wherein each channel state feedback reporting trigger is defined so that it is applied to one or more radio bearers. The base station also comprises a transmitting unit for transmitting configured radio bearer specific channel state feedback reporting trigger criteria to the UE. The configured channel state feedback reporting trigger criteria is typically transmitted to the UE through higher layer signaling.

According to one embodiment, the generating unit is adapted to generate different channel state feedback reporting trigger criteria that is applied to one or more radio bearers in order to obtain a channel state feedback reporting process which is adapted to different types of downlink traffic. When generating channel state feedback reporting trigger criteria this generating process may be based on the relation between downlink and uplink data of said UE.

BRIEF DESCRIPTION OF THE DRAWINGS

The present invention will now be described in more detail by unit of exemplary embodiments and with reference to the accompanying drawings, in which.

DETAILED DESCRIPTION

Briefly described, the present invention involves a method, a base station and a UE which takes into consideration that different types of downlink traffic have different demands when reporting channel state feedback information. More specifically, the present invention refers to a mechanism for applying each CQI reporting trigger, configured for a UE, to one or more specific radio bearers, each of which supports the respective CQI reporting trigger criteria. By introducing such a mechanism, a UE will be able to determine if a CQI report is to be transmitted by checking for every CQI reporting trigger if it is valid
And applied to at least one of the radio bearers, supporting the respective CQI reporting trigger criteria.

In the following exemplified embodiments, channel state feedback reports delivered from a UE will consequently be referred to as CQI reports, while base stations which participates in the channel state feedback reporting consequently will be referred to as eNodeBs. Furthermore, the rules configured for a UE, specifying under which conditions a CQI report is to be generated and transmitted will be referred to throughout this document as CQI channel state reporting trigger criteria. It is, however, to be understood that the described embodiments may be applicable also for other, comparable channel state feedback implementations, involving other comparable entities.

Figures 1, 2:
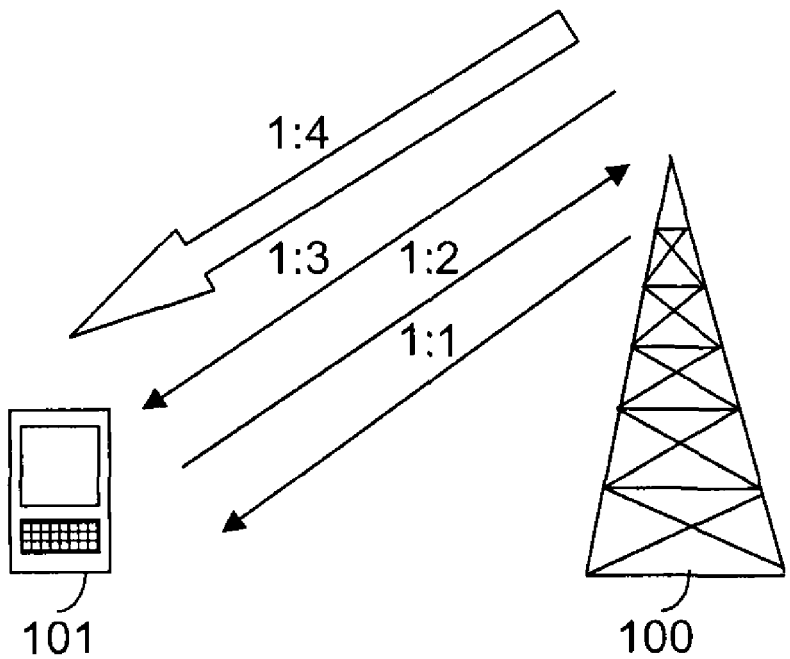
FIG. 1 is a basic overview of a conventional downlink scheduling concept, according to the prior art.
FIG. 2 is a table indicating a CQI reporting trigger configuration, according to the prior art.
Figures 3, 4:
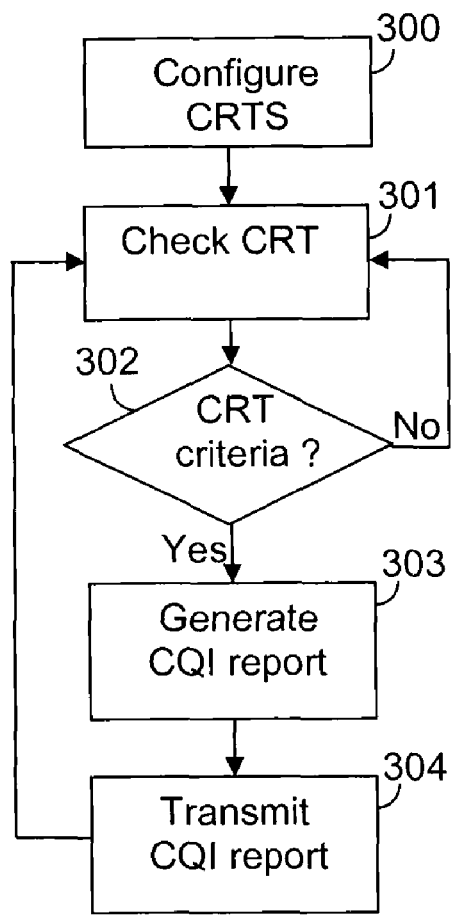
FIG. 3 is a flow chart describing a procedure for CQI a reporting from a UE to a base station, according to the prior art.
FIG. 4 is a table indicating a configuring of radio bearer specific CQI reporting triggers of one specific report type, according to one embodiment.

FIG. 3 is a simplified flow chart illustrating a method for providing channel state feedback in the form of CQI reports from a UE to an eNodeB, according to the prior art. The criteria for when and how to deliver different types of CQI reports, typically defined as presented above with reference to FIG. 2, is configured as a CRTS by eNodeB, and delivered to the UE in a first step 300. In a next step 301, a continuous checking procedure, for determining if any CRT criteria, specified by a CRTS is valid, is initiated. If A criteria is found to be valid in a step 302, a CQI report of a respective type will be generated at the UE at a step 303, and transmitted to the eNodeB, as illustrated with a final step 304. If, however, no CRT criteria is found to be, the checking procedure is repeated, starting at step 301. If there are a plurality of alternative types of CQI reports configured for the UE, the described checking procedure will be repeated for each report type.

Obviously, such a procedure for CQI report delivery leaves no room for flexibility as to how to meet different CQI report requirements that may be identified for different services.

FIG. 4 is a table illustrating how a number of radio bearer specific CQI reporting triggers may be configured in order to provide a more efficient CQI reporting mechanism which is adapted to take into consideration that different types of services may have different CQI reporting requirements. The table of FIG. 4 shows four different CQI reporting triggers, referred to as CRT 1-4, and four different radio bearers, RB 1-4. Each CQI reporting trigger is applied to one or more radio bearers. In the exemplified configuration of FIG. 4 it is specified that CRT 1 is applied to the two radio bearers, RB 1 and RB 4. CRT 2 and 3 are both applied to RB 2, while CRT 4 is applied to RB 4. The UE determines if a CQI report is to be transmitted to an eNodeB by checking the trigger criteria defined by each CRT, and if any of the trigger criteria, CRT 1-4, is met for at least one applied bearer, the UE determines that a corresponding CQI report is to be transmitted to the eNodeB.

One typical CQI reporting trigger criteria may be expressed as the availability of an uplink grant in combination with the existence of radio bearer data at the UE. A trigger responding to these criteria should typically be applied to a radio bearer which has a type of data traffic that has data to transmit in the uplink when there is also data to be transmitted in the downlink. For a radio bearer with unidirectional traffic with no or a limited amount of data to transmit in the uplink when there is also downlink data, this type of CQI report trigger should, however, not be applied. An example of such a radio bearer is a GBR bearer, adapted for transmission of voice telephony. By applying this kind of radio bearer specific CQI report trigger, a CQI report will be sent if there is a radio bearer for which a respective CQI reporting trigger is valid and if there is an uplink grant and data in this radio bearer.

Another example of a CQI reporting trigger is a periodic CQI reporting trigger that responds to a periodic timer and a rule that a certain CQI report shall be transmitted every time the timer expires. This kind of trigger could possibly be applied to a radio bearer dedicated for unidirectional traffic.

A procedure for providing a CQI report of a specific type to an eNodeB on the basis of radio bearer specific channel state feedback reporting trigger criteria according to one embodiment will now be described with reference to FIG. 5.

Figures 5, 6:
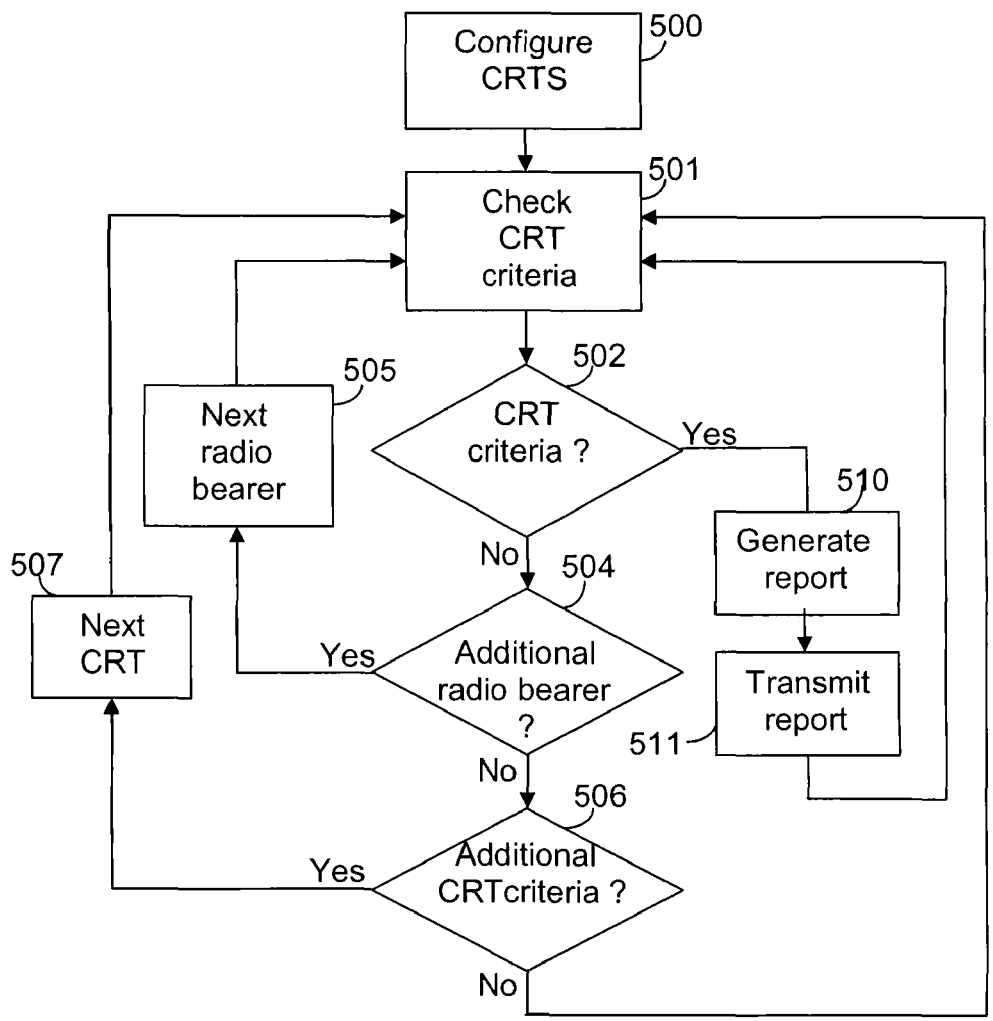
FIG. 5 is a flow chart illustrating a procedure for radio bearer specific CQI reporting, according to one embodiment.
FIG. 6 is a group of tables illustrating a configuration of radio bearer specific CQI reporting triggers of different types, according to another embodiment.

FIG. 5 is a flow chart illustrating how a UE, having established contact with a communication network via an eNodeB determines whether a CQI report is to be transmitted to the eNodeB or not by monitoring CRT criteria configured for the UE. In a first step 500, CQI reporting trigger criteria to be applied for the UE is configured by the eNodeB and delivered to the UE. A continuous procedure for checking the trigger criteria set for the UE is then initiated in a next step 501. Starting with a first CRT (CRT 1) in a next step 502, it is checked if the trigger criteria defined by CRT 1 has been applied to a first radio bearer (RB 1). If the criteria is found to be valid and is applied for RB 1, i.e. RB 1 supports this trigger criteria, the channel state feedback reporting procedure is continued at a step 510, where a report of the specified type is generated. The generated report is then transmitted to the eNodeB in a final step 511. Subsequent to the transmission, the describe procedure is repeated, starting again with checking the first CRT at step 501. However, if it is determined that CRT 1 is not applied to RB 1, the described procedure is gradually repeated for each remaining radio bearer, as illustrated with steps 504 and 505. When the criteria defined by CRT 1 has been checked for all radio bearers, it is determined if there is any additional CRT criteria defined in a next step 506. If there are any additional CRT defined for a respective CRTS, this CRT is interrogated in steps 506 and 507, and the procedure described above is repeated also for this CRT. When there is no remaining CRT to check, the described procedure is repeated, starting once again with CRT 1 at step 501.

The embodiment described above refers to a scenario where only one type of CQI report is applied, and thus, once one trigger criteria, applied to at least one of the radio bearers of the UE is found to be valid, the checking of CRTS is interrupted and a CQI report of the relevant type is generated and transmitted to the eNodeB.

If there are more than one type of CQI reports, such as i.e. partial reports, full reports and/or MIMO reports, specified for a UE, a separate set of radio bearer specific CRTs may be configured for each report type. Another alternative configuration of channel state feedback reporting trigger criteria defined for a plurality of report types is therefore illustrated with a number of tables in FIG. 6. Each of the three different CQI types, CQI A, B and C, respectively, configured for a UE, has one associated set of CRTs, defined as CRT 1-4, each set defining which one or more radio bearers that is applied to a specific trigger criteria. In this exemplified configuration, report type CQI A have four associated CRTs, CRT 1-4, where CRT 1 is applied to Radio Bearer 4, RB 4, CRT 2 is applied to both RB 1 and 2, CRT 3 is applied to RB 2 only, while CRT 4 is applied to RB 4.

Figure 7:
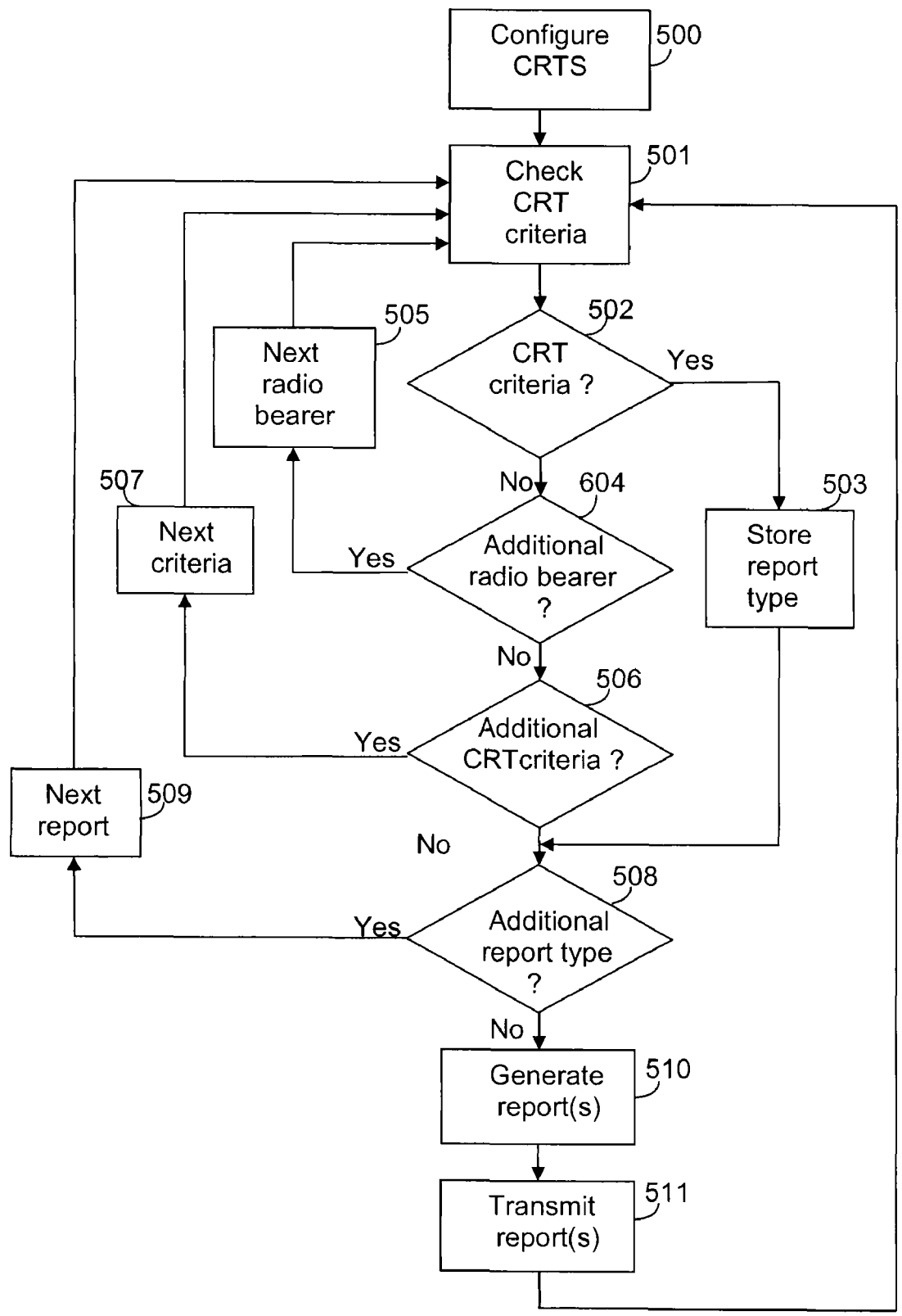
FIG. 7 is a flow chart illustrating a procedure for radio bearer specific CQI reporting, according to another embodiment.
Figure 8:
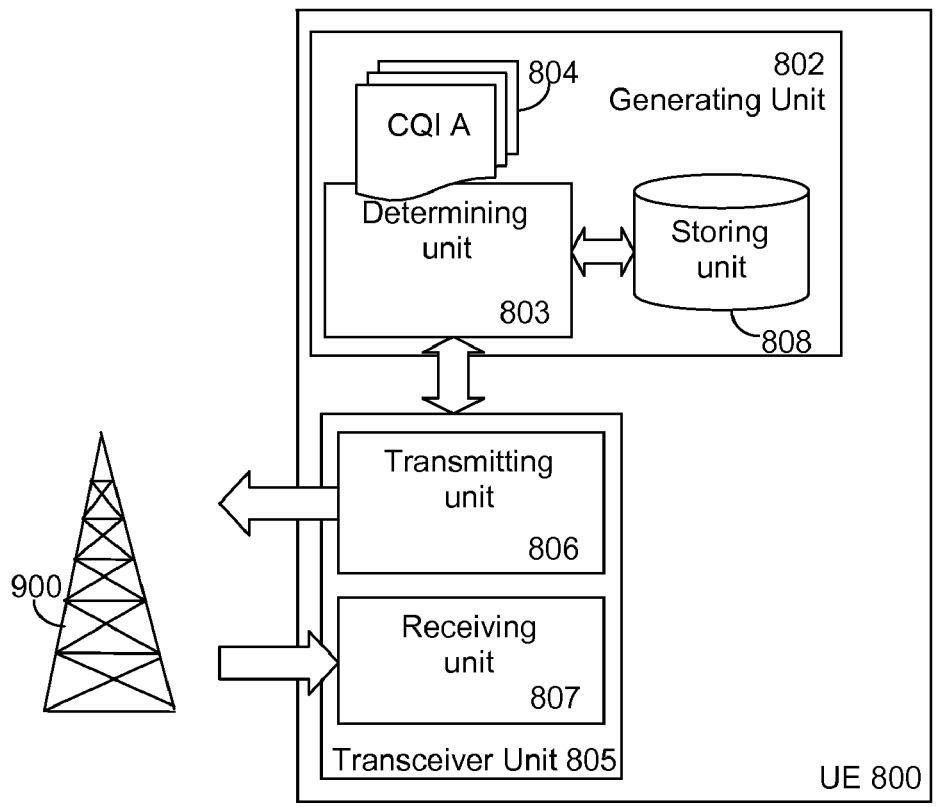
FIG. 8 is a block diagram, schematically illustrating a UE, adapted to provide radio bearer specific CQI reporting, according to any of the described embodiments.

An alternative method adapted to operate in accordance with a configuration, such as the one described with reference to the previously described tables of FIG. 6 will now be described with reference to FIG. 7.

The first three steps 500-502 basically perform the same procedure as the corresponding steps of FIG. 5. According to this embodiment, however, a match in step 502 will result in the storing of an indication of a valid CRT for the respective report type in a storage unit of UE. Once all triggers associated with all CQI report types have been checked, the storage unit will hold an indication of each CQI report type for which at least one match have been identified. Thereby, every CRT will be checked in each CRT criteria checking cycle, and a preferred CQI report or set of reports may be selected for transmission to the eNodeB, rather than the report associated with the first matching trigger. The procedure is, thus, continued by successively executing steps 504-507 in accordance with the first embodiment of FIG. 5. In order to be able to check multiple report types, however, also steps 508-509 are introduced. When all report types configured for the UE have been checked in step 508, one or more CQI reports are generated in a step 510. In step 510, the storing unit is interrogated, and, one or more CQI reports may be selected and generated, depending on certain rules, specified for the UE.

Typically only one CQI report is transmitted in response to an interrogation of one or more CRTS. There are, however occasions when a transmission of two or more reports may be applicable. For the selection of one or more report(s), priority rules, specifying conditions for how to prioritize selection of CQI reports may be included in the CQI reporting configuration of the UE. Thereby, priority rules, specifying a preferred CQI report type, or a subset of report types, may also be considered when determining which kind of channel state feedback the UE is to be forwarding to the eNodeB. When it has been determined which one or more approved CQI reports to provide to the eNodeB in step 510, the one or more reports are transmitted to the eNodeB in a final step 511, before the described procedure is once again repeated, starting at step 501.

A UE configured to be operating in accordance with any of the radio bearer specific channel state feedback reporting procedures described above will have to be adapted accordingly. UE 800, which is typically connected to an LTE network via eNodeB 900, comprises a generating unit 802 for generating CQI reports to be transmitted to eNodeB 900 when triggered. The generating unit 802 further comprises a determining unit 803, adapted to be triggered by radio bearer specific CQI reporting trigger criteria 804, which has been provided to the UE 800 from the eNodeB 900 and stored by the generating unit 802. The generating unit 802 is connected to a transceiver unit 805, comprising a transmitting unit 806 and a receiving unit 807. The transmitting unit 806 is adapted to transmit a CQI report of a relevant type to eNodeB 900 once it has been determined by the determining unit 803 that at least one CQI report trigger, applied to at least one radio bearer is valid. UE also comprises a storing unit 808, adapted to store an indication of a respective CQI report type each time a match of trigger criteria has been registered. In the end of each channel state feedback reporting cycle, the generating unit 802 may generate one or more CQI reports either in response to a matching CRT criteria, or on the basis of the information retrieved from the storing unit 808, optionally in combination with rules, such as e.g. prioritization rules configured and provided to the UE by eNodeB.

Also a base station, providing a radio bearer specific channel state feedback reporting mechanism according to any of the described embodiments has to be adapted accordingly. Such an base station will be adapted to provide a radio bearer dependent channel state feedback reporting trigger criteria configuration according to any of the described embodiments, and, optionally also prioritization rules to a UE.

Figure 9:
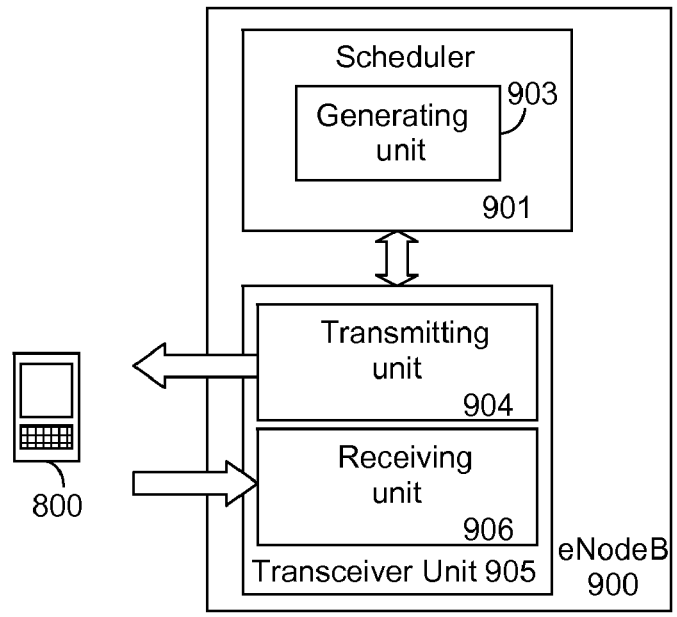
FIG. 9 is a block diagram, schematically illustrating a base station, adapted to configure radio bearer specific channel state feedback reporting triggers, according to any of the described embodiments.

FIG. 9 is a general description of a base station 900, typically an eNodeB, according to one embodiment. The eNodeB 900 have a scheduler 901, adapted to schedule different types of uplink and downlink communication between an eNodeB 900 and a UE 800. The scheduler 901 typically comprises a separate downlink scheduler function and a downlink scheduler function (not shown), which may interact with each other in order to be able to use available resources more efficiently. The scheduler 901 comprises a generating unit 903, adapted to generate a configuration for the UE 800, comprising at least CQI report triggering conditions to be applied for the UE 800. A specific set of CQI reporting trigger criteria is defined for each type of CQI report, specified for the UE. Once the respective CQI reporting trigger criteria has been specified for the UE 800 by the generating unit 903, this data is transmitted to the UE 800 via a transmitting unit 904 of a transceiver unit 905. Once the UE 800 has been configured, eNodeB 900 may receive CQI reports transmitted by the UE 800 via a conventional receiving unit 906 of the transceiver unit 905.

Figure 10:
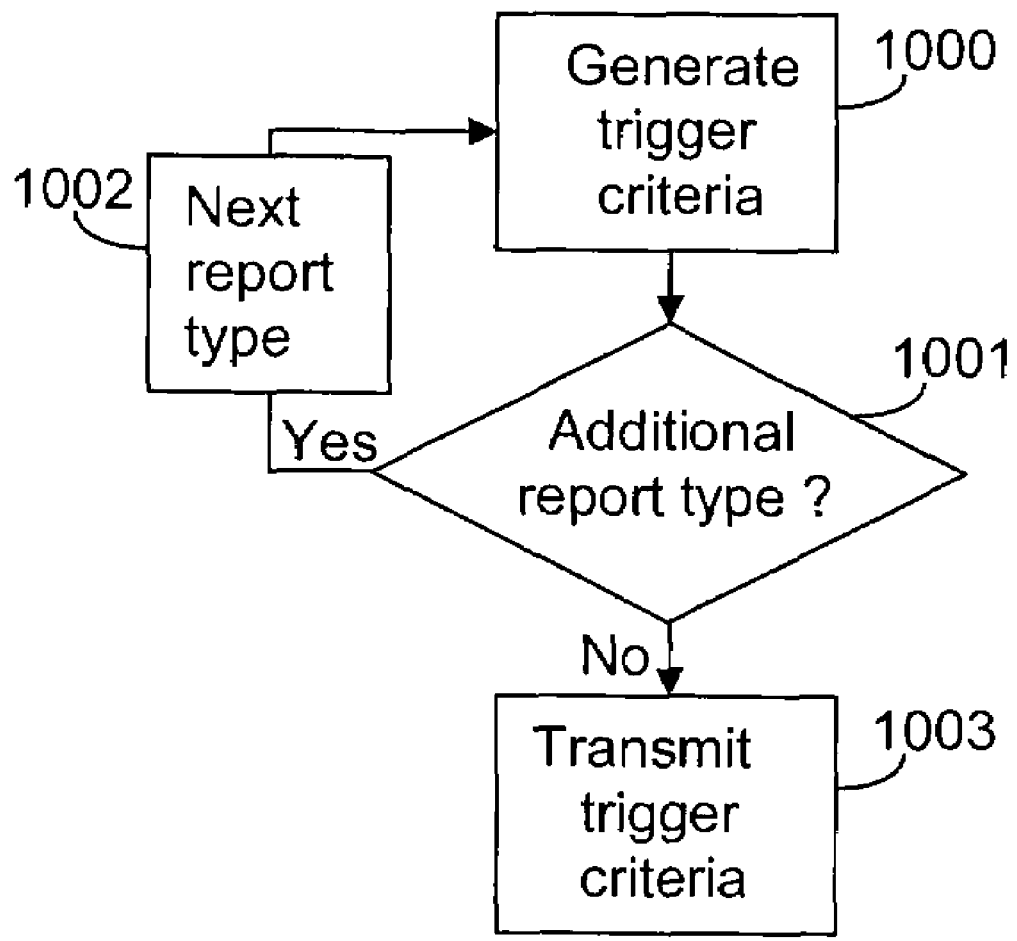
FIG. 10 is a flow chart, a procedure for illustrating a base station, adapted to configure radio bearer specific channel state feedback reporting triggers, according to one embodiment.

A simplified procedure of an eNodeB providing the configuration associated with the CQI reporting procedure to a UE as described above will now be described with reference to FIG. 10. In a first step 1000, channel state feedback reporting trigger criteria to be applied to a UE is generated according to certain predetermined rules. Since also the radio bearers of the UE are to be considered when generating the trigger criteria, such a specification is typically based on different traffic scenarios which are likely to occur between the eNodeB and the respective UE. Optionally, the configuration also comprises priority rules, as described above. In a next step 1001 and 1002, the generating procedure is repeated for additional CQI report types, if one or more additional types are applicable for the UE. The configured trigger criteria is transmitted to the UE in a final step 1003. The described procedure may be repeated once it is determined that a reconfiguration of the trigger criteria is necessary.

To conclude, different CQI reporting requirements associated with different services will be considered when configuring trigger criteria and, thus, with more efficient control channel handling in association with CQI reporting, the total available resources can be more efficiently utilized.

Even though the invention has been described in relation to the concept of LTE (Long Term Evolution) and CQI reporting, it could be applied to any system that applies channel state feedback reporting and scheduled uplink, e.g. WCDMA with enhanced uplink. The invention is thus not limited to the disclosed embodiments, but is also intended to cover various modifications within the scope of the appended claims.

The invention claimed is:

1. A method in a user equipment (UE), for providing channel state feedback from the UE to a base station, said method comprising the steps of:
    determining, for each of different sets of channel state feedback reporting trigger criteria applied for different types of channel state feedback reports, whether at least one channel state feedback reporting trigger criteria included in that set is valid or not, wherein each channel state feedback reporting trigger criteria is applied to one or more specific radio bearers;
    if more than one of said sets includes a channel state feedback reporting trigger criteria that is valid, generating one or more channel state feedback reports on the basis of a prioritization rule that specifies how to prioritize between different types of channel state feedback reports, between different subsets of such report types, or both; and
    transmitting said one or more channel state feedback reports to the base station.

2. The method according to claim 1, wherein said determining comprises storing indications of the types of channel state feedback reports that are associated with sets that include at least one valid channel state feedback reporting trigger criteria and wherein said generating and transmitting are performed on the basis of the stored indications after said determining has been performed for each different.

3. A method in a base station comprising a scheduler for configuring channel state feedback reporting trigger criteria for a user equipment (UE), said method comprising the steps of:
    generating channel state feedback reporting trigger criteria for said UE, wherein each channel state feedback reporting trigger is applied to one or more specific radio bearers;
    repeating said generating step for each channel state feedback report type to be applied to the UE;
    creating rules specifying how to prioritize between different types of channel state feedback reports and/or different subsets of such report types when channel state feedback reporting trigger criteria specified for more than one report type has been found to valid for the UE; and
    transmitting the channel state feedback reporting trigger criteria and said rules to the UE.

4. The method according to claim 3, wherein said channel state feedback reporting trigger criteria is transmitted to the UE through higher layer signaling.

5. The method according to claim 4, wherein said generating is based on the relation between downlink and uplink data of said UE.

6. A user equipment (UE) in a communication network, configured for providing channel state feedback to a base station, and said UE comprising:
    a determining unit configured to determine, for each of different sets of channel state feedback reporting trigger criteria applied for different types of channel state feedback reports, whether at least one channel state feedback reporting trigger criteria included in that set is valid or not, wherein each channel state feedback reporting trigger criteria is applied to one or more specific radio bearers;
    a generating unit configured, if more than one of said sets includes a channel state feedback reporting trigger criteria that is valid, generate one or more channel state feedback reports on the basis of a prioritization rule that specifies how to prioritize between different types of channel state feedback reports, between different subsets of such report types, or both; and
    a transmitting unit configured to transmit said one or more channel state feedback reports to the base station.

7. A UE according to claim 6, wherein said generating unit is configured to generate the one or more channel state feedback reports after said determining has been performed for each different set.

8. A UE according to claim 7, wherein said generating unit further comprises a storing unit for storing an indication of each report type for which an associated channel state feedback reporting trigger criteria has been found to be valid.

9. A base station comprising a scheduler for configuring channel state feedback reporting trigger criteria for a user equipment (UE), said base station comprising:
    a generating unit for generating radio bearer specific channel state feedback reporting trigger criteria for said UE, wherein each channel state feedback reporting trigger is applied to one or more specific radio bearers, and for creating rules specifying how to prioritize between different types of channel state feedback reports and/or different subsets of such report types when channel state feedback reporting trigger criteria specified for more than one report type has been found to valid for the UE; and a transmitting unit for transmitting said radio bearer specific channel state feedback reporting trigger criteria and said rules to the UE.

10. A base station according to claim 9, wherein said transmitting unit is configured to transmit said channel state feedback reporting trigger criteria to the UE through higher layer signaling.

11. The base station according to claim 9, wherein said generating unit is configured to generate different channel state feedback reporting trigger criteria that is applied to one or more radio bearers in order to obtain a channel state feedback reporting process which is adapted to different types of downlink traffic.

12. The base station according to claim 11, wherein said generating unit is further configured to base said generating process on the relation between downlink and uplink data of said UE.

* * * * *